INVENTOR.
James A. Jensen,
BY Paul & Paul
ATTORNEYS.

July 2, 1963
J. A. JENSEN
3,095,894
TANK LOADING AND UNLOADING SYSTEM FOR TANK VEHICLES
Filed May 25, 1960
4 Sheets-Sheet 3
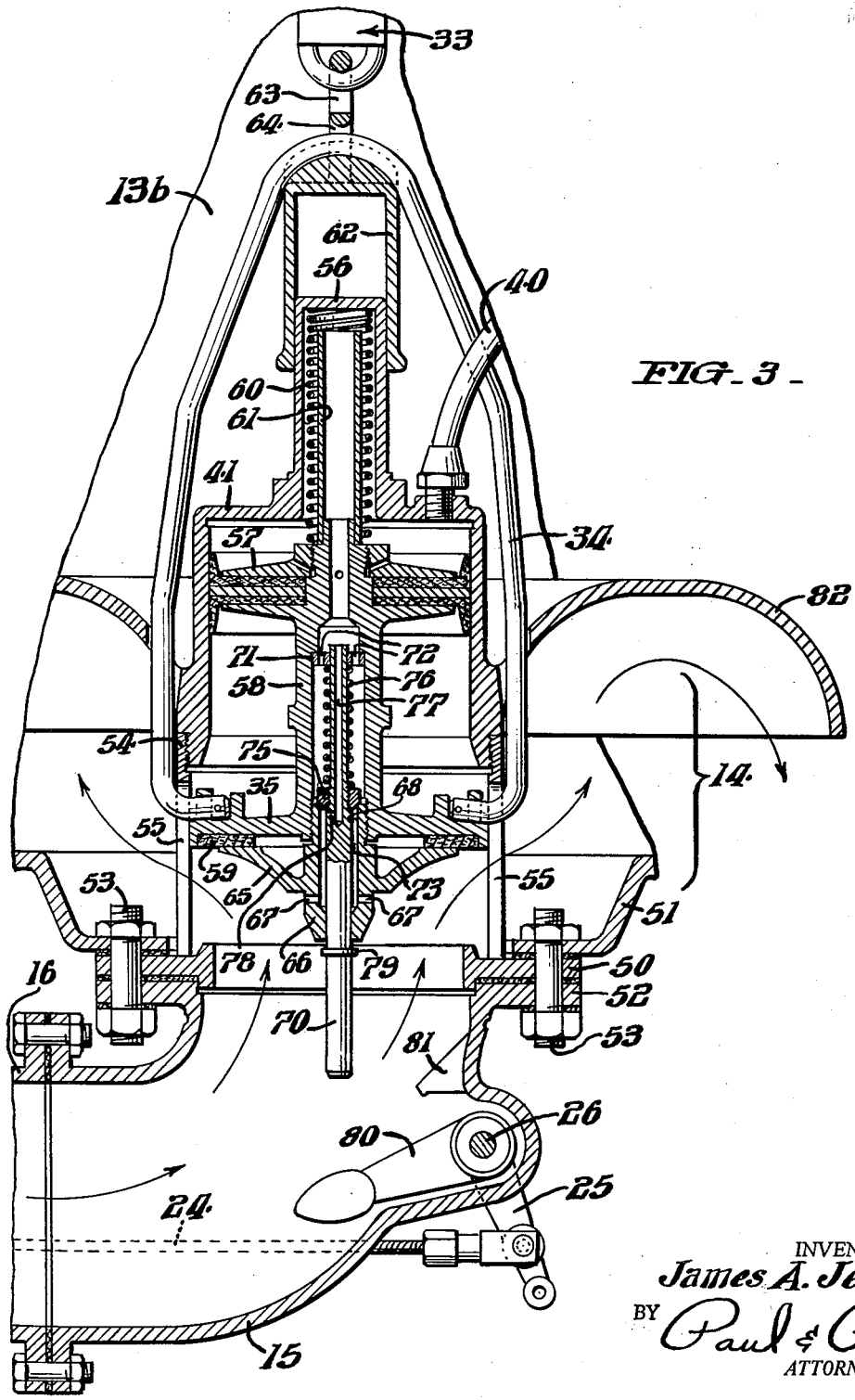
FIG_3_
INVENTOR.
James A. Jensen,
BY Paul & Paul
ATTORNEYS.

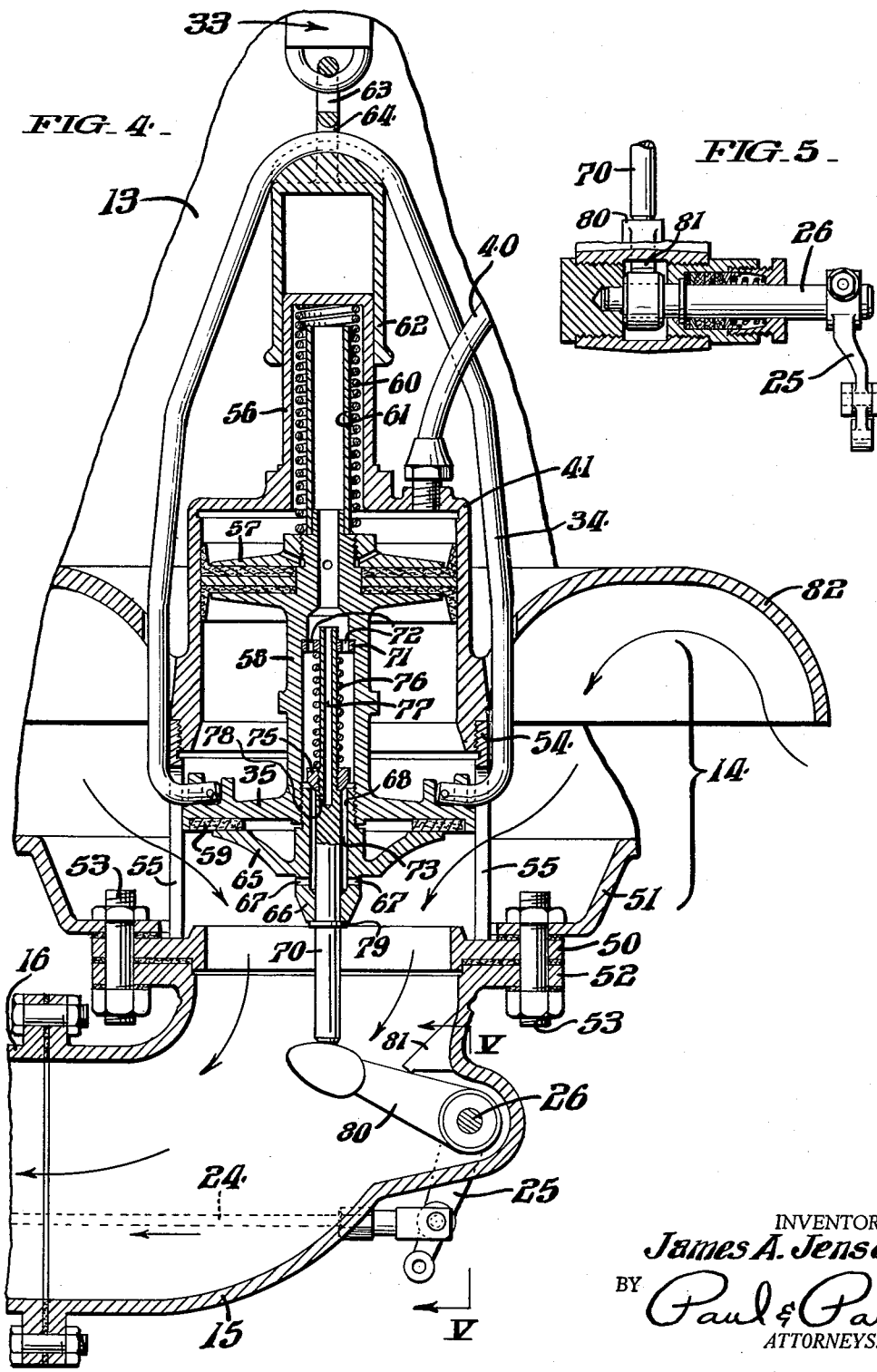

United States Patent Office 3,095,894
Patented July 2, 1963

3,095,894
TANK LOADING AND UNLOADING SYSTEM FOR TANK VEHICLES
James A. Jensen, Haverford, Pa., assignor to Philadelphia Valve Company, Philadelphia, Pa., a firm
Filed May 25, 1960, Ser. No. 31,740
4 Claims. (Cl. 137—267)

This invention relates to a tank loading and unloading system. More particularly, it is concerned with a system for loading and unloading the tanks of vehicles ordinarily used in transporting liquid commodities such as fuel oil or gasoline.

The chief aim of my invention is to provide a system for the above purpose, which is simple and reliable in operation, and which enables either loading or unloading of the tank to be accomplished in a minimum of time.

In connection with a system having the above attributes, it is a further aim of my invention to provide an automatic safety means for preventing over-filling of the tanks with consequent loss of the liquid.

Still another object of my invention is to provide means by which the aforesaid safety means can be checked from time to time to insure that it is in proper working order.

How the foregoing objectives and important advantages are realized in practice will appear from the following detailed description of the attached drawings wherein:

FIGS. 3 and 4 are views respectively similar to FIG. 2, FIG. 3 showing the valve fully open incident to loading of a tank compartment, and FIG. 4 showing the valve fully open incident to unloading of a tank compartment; and FIG. 5 is a fragmentary detail view in section taken as indicated by angled arrows V—V in FIG. 4.

Figure 1:
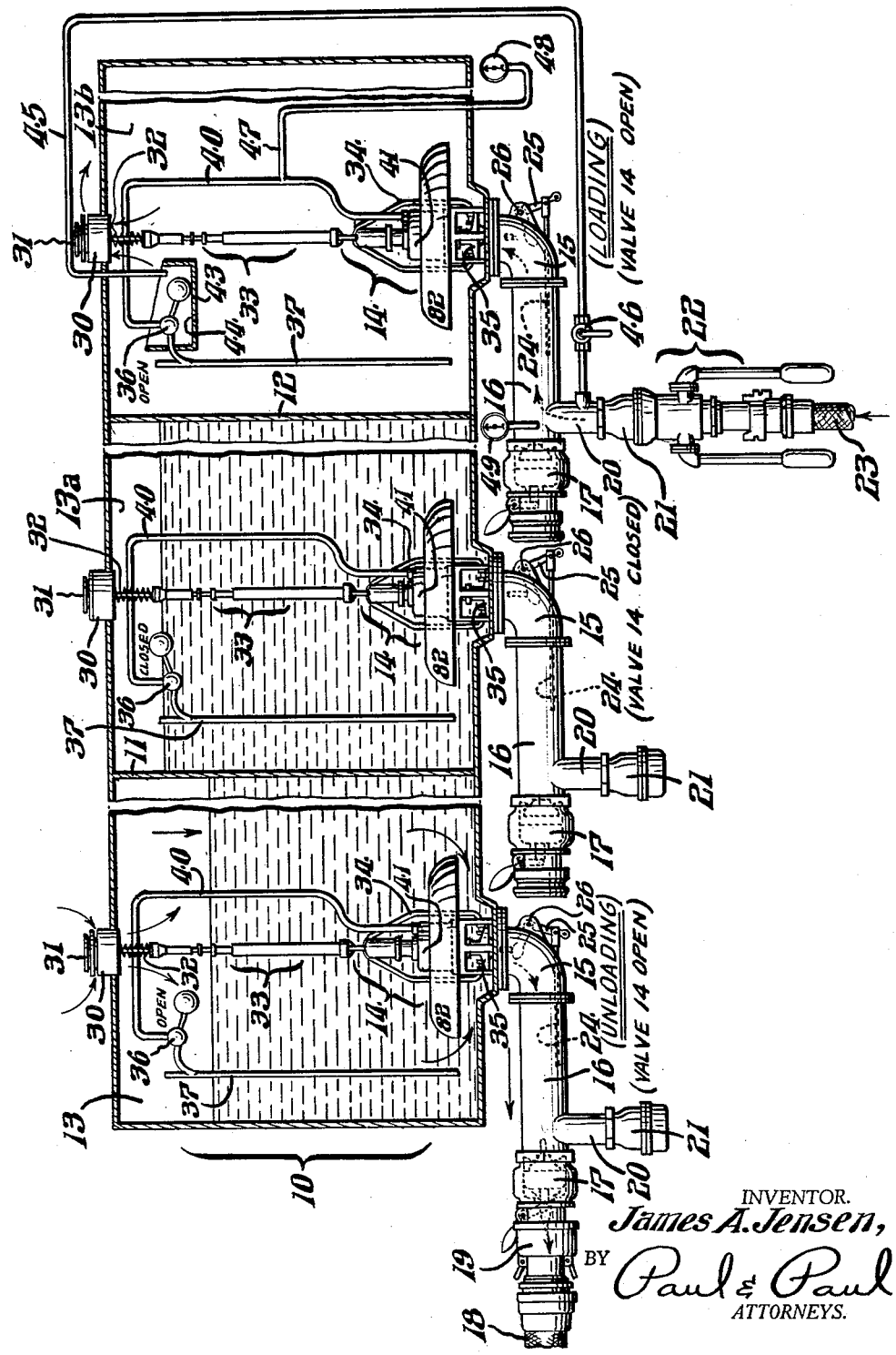
FIG. 1 shows, in longitudinal section, the multi-compartment tank of a liquid commodity transporting vehicle embodying my present invention.

With reference first, more particularly to FIG. 1 of these illustrations, the numeral 10 comprehensively designates the tank of an oil or gasoline transporting vehicle which, in this instance, is subdivided internally by spaced bulkheads 11 and 12 into compartments 13, 13a and 13b. At their bottoms the compartments 13, 13a and 13b are provided respectively with normally balanced fill-drain valves 14 which are identical and which are connected individually by means of elbows 15, to horizontal fill-drain pipes 16 beneath the tank, said pipes terminating respectively in unloading faucets 17, which may be of the type disclosed in U.S. Patent 1,565,649 granted to me on December 15, 1925, for selective connection thereto of a delivery hose such as indicated at 18, having at the end thereof a quick attachable and detachable coupling device 19 which may be of the type disclosed in U.S. Patent 2,700,559 granted to me on January 25, 1955. The pipes 16 respectively have short downward branches 20, each of which terminates in a self closing adapter 21 for connection thereto of a coupler valve such as shown at 22 of a well known commercially available type at the end of a loading hose 23. Opening of the valves 14 selectively is initiated, as later explained, by pull upon a cord or cable 24 connected to a lever 25 affixed to the outer end of a shaft 26 journaled crosswise within the corresponding elbows 15, as instanced in FIG. 5. The tank compartments 13, 13a and 13b are further provided at their tops respectively with identical venting valves 30, of which the closure elements 31 are urged toward their seats by springs 32. The closure elements of the vent valves 30 are coupled, with capacity for slight independent play, by means of linkage 33 to yokes 34 connected respectively to the closure elements 35, of the corresponding valves 14, for a purpose also more fully explained hereinafter. Supported in the compartments 13, 13a and 13b near their tops are individual float valves 36 which close automatically when the corresponding compartments are filled to a definite level, and which open automatically as the liquid is drained from said compartments. Connected to the float valves 36 are tubes 37 which extend down into close proximity to the bottoms of the corresponding tank compartments 13, 13a and 13b, said tubes being open at their lower ends. Leading respectively from the tops of the actuating cylinders 41 of the corresponding valves 14 to the valves 36 are tubes 40.

As shown, the float valve 36 in the compartment 13b is located above a small open trough 43 having a drain hole 44 in the bottom thereof. Arranged to discharge into the receptacle 43 is a tube 45 which leads from the downward branch 20 of the pipe 16 and in which is interposed a normally closed hand valve 46. It is to be understood that the orifice 44 in the bottom of trough 43 is smaller than the flow area of tube 45. A branch tube 47 connected to the tube 40 within the compartment 13b extends to the exterior through the bottom of the tank and terminates in a pressure gauge 48. A pressure guage 49 is also interposed in the pipe 16. Although not illustrated, the facilities just described are preferably duplicated, in practice, in each of the other tank compartments 13 and 13a.

Figure 2:
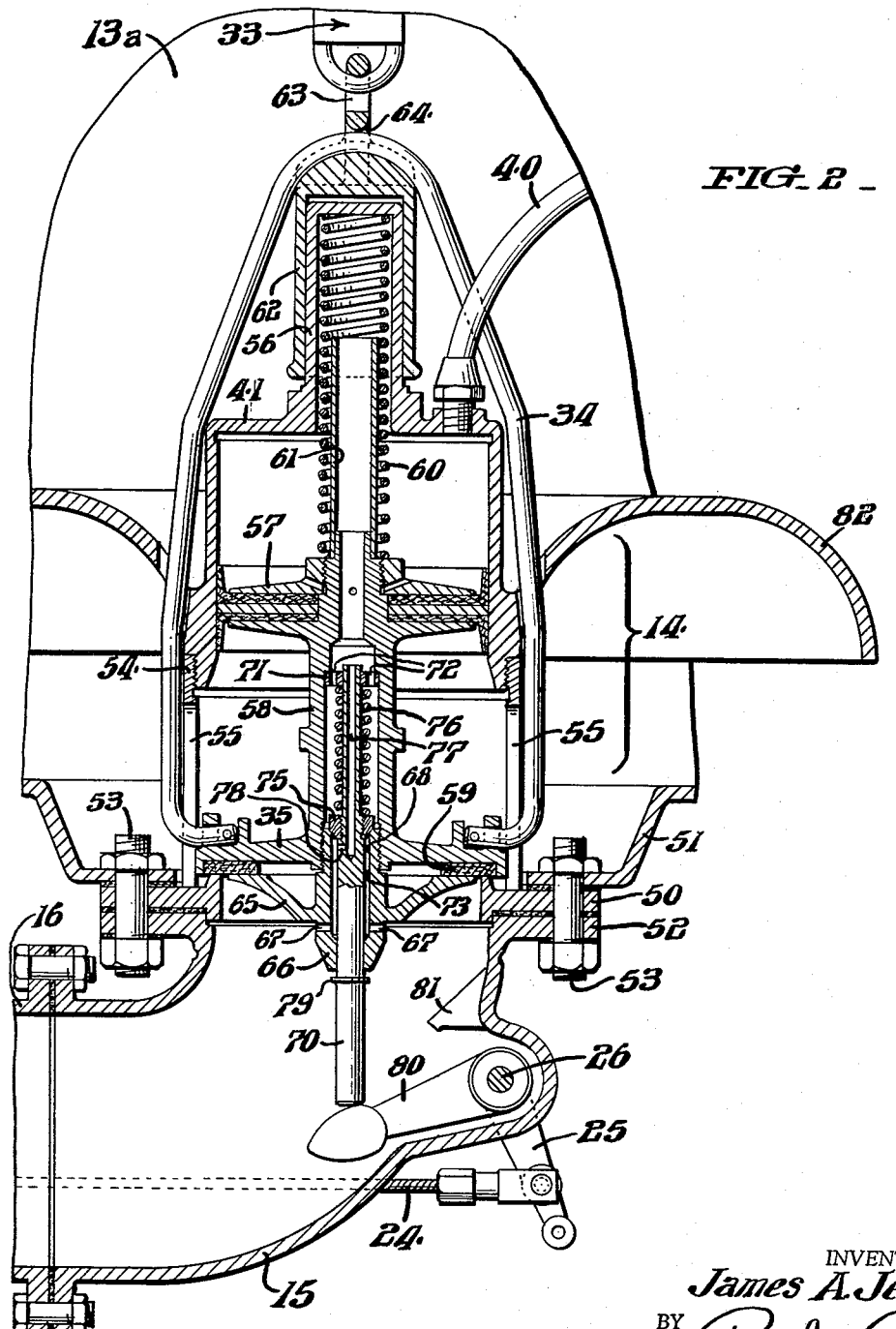
FIG. 2 is a fragmentary view in section drawn to an enlarged scale and showing in greater detail one of the elements of the system in the form of a bottom fill-drain valve in its normal or closed position.

The valves 14, being identical, the following description of one of them will be considered to hold equally for all of them. From FIGS. 2–4 it will be noted that each valve 14 has a base ring 50 which is clamped between an apertured depression 51 at the bottom of the tank corresponding section and the top flange 52 of the elbow 15 by bolts 53. Screwed into an annulus 54 supported at an elevation above the ring 50 by legs 55, is the actuating cylinder 41 of the valve 14, said cylinder having a diametrically reduced upward extension 56. Operative in the cylinder 41 is a piston 57 whereto is integrally connected, by a tubular neck 58, the closure element 35, which element is provided at the bottom with a gasket 59 to cooperate with a seat around the port opening in the ring 50. The closure element 35 is normally held to its seat as in FIG. 2 by a spring 60 which freely surrounds an upward axial tubular prolongation 61 of the piston 57, said prolongation reaching up into the hollow of the extension 56 of the cylinder, with clearance all around, to permit free action of the spring 60, which latter is in compression between the top of said extension and said piston. Slidably engaged upon the reduced upward extension 56 of the cylinder 41 is a thimble-like element or dash pot 62, an eye lug 63 at the top which is pierced as at 64 for passage through it of the yoke 34. Insofar as described up to this point, the valve 14 is substantially identical with the valve disclosed in U.S. Patent 2,516,996 granted to me on August 1, 1950. For the purposes of my present invention, the upper end of the hub 66 of the disc 65 by which the gasket 59 is clamped to the closure element 35 is threadedly engaged into the bottom of the neck 58, said hub having adjacent its bottom end small lateral or diametral apertures 67. The bore in the hub 66 of the disc 65 is enlarged as at 68 down to the level of the diametral openings 67, and extending up through it into the neck 58 is a slide rod 70 which, at its upper end, is guided by a disc 71 fixedly set into the hollw of said neck and having a plurality of annularly-arranged orifices 72 therein. A coned poppet 75 screwed onto a threaded portion of the rod 70 is adapted to cooperate with the tapered seat around the top of the hub 66 of the disc 65 to normally obstruct the annular interval 73 surrounding said rod in the enlarged bore of said hub, said poppet being normally held seated by a helical spring 76 in compression between it and the disc 71. As further shown, the rod has an axial bore 77 which extends down from the top end of said rod to a point below the poppet 75 and which is there in communication by way of a small lateral orifice 78, with the annular interval 73 surrounding said rod within the hub 66 of the disc 65. Upward movement of the rod 70 is limited by a collar 79 on its protruding end portion, said collar being adapted to contact the bottom end of the hub 66 of the disc to limit the upward movement of the rod relative to the closure element 35. Affixed to the shaft 26 within the elbow 15 is a cam finger 80 which underreaches the rod 70 and which upon actuation of the lever 25 by the pull cord 24 lifts the rod, as later on explained, the upward swing of said cam finger being limited by a stop 81 at the interior of said elbow. In order to minimize turbulence of the liquid during loading of the tank compartments each valve 14 is provided with an annular dome-like shroud 82 to overreach the depression 51 in the bottom of the corresponding tank compartment.

As illustrated in FIG. 1, the middle compartment 13a of the tank 10 is filled to capacity, the valve 14 being held closed by the spring 60 and the corresponding valve 36 being held closed by its float, the relief valve 30 having the capacity to open slightly in opposition to the action of the spring 32 for relief of the atmosphere or vapor from above the liquid level in said compartment.

Loading Operation

When the tank compartment 13b, for example, is empty as in FIG. 1, the valve 14 is balanced and closed, and the float valve 36 is open. The procedure for loading is as follows: The valve 22 is coupled to the branch 20 of the conduit 16 and then opened to admit liquid under high pressure (e.g. 60 p.s.i.g.) delivered from a supply source (not illustrated) through the hose 23 to enter said conduit. As the pressurized liquid is directed upwardly through the elbow 15 it impinges against the bottom of the closure element 35 of the valve 14 and lifts said element from its seat to the full open position in which it is shown in FIG. 3, in opposition to the force of the spring 60. During this action, some of the liquid enters the channel 73 by way of the apertures 67, flows up in said channel and, by way of the aperture 78, enters the tubular upper portion 77 of the stem 70, rises in the tubular prolongation 61 of the piston 57 and spills into the cylinder 41 above said piston, wherefrom the liquid is expelled through the tube 40 and the open float valve 36 downwardly through the tube 37 into the compartment 13b. The float valve 36 being open, no pressure can build up in the cylinder 41 above the piston. Under these conditions the valve 14 is unbalanced so that it can be opened by the loading pressure. Opening of the valve 14 thus takes place without attendant shock or noise. During loading of the compartment 13b the inrushing pressurized liquid is baffled by the downward deflecting action of the shroud 82 with consequent minimization of turbulence which would otherwise occur. As the piston 57 of valve 14 rises, it will be seen that, through the linkage 33, the vent valve 30 will be opened fully as in FIG. 1 to permit escape, from the top of the tank compartment 13b, of the air displaced by the incoming liquid. To pretest the system to make sure the mechanism will shut off, the operator opens valve 46 whereupon liquid will flow through the tube 45 into the receptacle 43 beneath the float of valve 36 which valve will be closed as a result and prevent further bleeding from the top of the cylinder 41 by way of tube 40. With the float valve 36 closed, the cylinder 41 soon fills with liquid coming in through the orifices 78 and the pressure builds up in said cylinder equal to the line pressure. The valve 14 is now in balance and the spring 60 closes it. In this way it is possible to determine, by comparing the readings of the pressure gauges 48 and 49, that the float valve 36 is in dependable operating condition. To proceed with loading, it is necessary only to close the hand valve 46 whereupon the liquid will drain from the receptacle 43 through the hole 44 in the bottom thereof to allow the float valve 36 to re-open and the loading to proceed as before. Upon opening of the float valve 36, the valve 14 becomes unbalanced and is opened by the force of the loading pressure of the incoming liquid. Eventually, when the liquid in the compartment 13b reaches a level corresponding to that in the filled compartment 13a, the float valve 36 will close automatically with consequent prevention of further bleeding from the cylinder 41 and automatic closing of the valve 14 by the spring 60. When loading the compartment, the loading pressure does not force the poppet 75 open because its spring 76 is very heavy and would require a pressure of 150 p.s.i. to open it, whereas the pressure used in loading is only about 60 p.s.i.

Unloading Operation

To unload the tank compartment 13, for example, the drain hose 18 is connected at 19 to the valve 17 which is then opened, whereupon the cable 24 is pulled to initiate opening of the valve 14 as in FIG. 4. In this operation, the slide stem 70 of valve 14 is first raised and, as the collar 79 thereon contacts the bottom of the hub 66 on the disc 65 of the closure element 35, the poppet 75 is lifted from its seat. As a consequence, liquid is permitted to flow from the top of the cylinder 41 by way of the passages 61, 77, 78, 73, openings 67 and tube 16. If it were not for the poppet 75, the liquid in the cylinder 41 would have to be forced out of the small orifices 78 which would take considerable time and put a heavy strain on the cable 24. Thus, as the poppet 75 opens, a flow area much greater than that of the orifices 78 is provided so that the valve 14 is opened quickly with exertion of but little effort on the part of the operator. As the slide stem 70 is further raised, the closure element 35 of the valve 14 is bodily lifted with continued displacement of liquid from the top of the cylinder 41 as before. As the valve 14 is fully opened, as just explained, the air vent valve 30 is concurrently fully opened through the linkage 33 to admit displacement air into the top of the tank compartment 13. To stop the draining after a desired amount of liquid has been discharged from the compartment 13, the cable 24 is released and the valve 14 is forced to closed position by the spring 60 incident to which the liquid is drawn from within the compartment 13 into the cylinder 41 by action of the piston 57 through the tube 40 and the open float valve 36.

While the preferred embodiment of this invention has been described in some detail, it will be obvious to one skilled in the art that various modifications may be made without departing from the invention as hereinafter claimed.

Having thus described my invention, I claim:

1. In apparatus for controlling the filling and draining of liquid in a tank through normally closed external supply and drain conduits, the combination comprising means having an inlet-outlet passage through which liquid is supplied to and drained from said tank, a hollow valve body overlying said passage, an assembly including a main valve normally closing said inlet-outlet passage, and a piston in said body movable with said main valve and defining with said body a chamber over said piston, means biasing said main valve and yieldably holding the same in closed position, said main valve being movable for opening said inlet-outlet passage and said piston being movable in said body, against the influence of said bias, by supply liquid entering the tank through said inlet-outlet passage, means providing an inlet passage leading to said chamber from the inlet-outlet passage of said main valve, means providing an outlet passage leading from said chamber to the interior of the tank, a liquid controlled valve in said outlet passage open to permit maximum flow through said outlet passage, said liquid controlled valve being responsive to liquid level in the tank for closing, thereby to shut off flow through said outlet passage so that when said liquid controlled valve is open pressure is released in said chamber and said main valve is quickly opened by supply liquid pressure thereon and when said liquid controlled valve is closed pressure is increased in said chamber, whereupon said main valve closes under the influence of said bias, shutting off the flow of supply liquid to the tank, means providing an auxiliary outlet passage leading from said chamber to said inlet-outlet passage, a release valve normally closing said auxiliary passage, and means operable for actuating said release valve thereby to first release the pressure in said chamber, and thereafter to quickly open said main valve against the influence of said bias thereby to permit liquid to drain from said tank through said inlet-outlet passage.

2. In apparatus for controlling the filling and draining of liquid in a tank through normally closed external supply and drain conduits, the combination comprising means having an inlet-outlet passage through which liquid is supplied to and drained from said tank, a hollow valve body overlying said passage, an assembly including a main valve normally closing said inlet-outlet passage, and a piston in said body movable with said main valve and defining with said body a chamber over said piston, means biasing said main valve and yieldably holding the same in closed position, said main valve being movable for opening said inlet-outlet passage and said piston being movable in said body, against the influence of said bias, by supply liquid entering the tank through said inlet-outlet passage, means providing a permanently open inlet passage leading to said chamber from the inlet-outlet passage of said main valve, means providing an outlet passage leading from said chamber to the interior of the tank, a liquid controlled valve in said outlet passage open to permit maximum flow through said outlet passage, said liquid controlled valve being responsive to liquid level in the tank for closing, thereby to shut off flow through said outlet passage so that when said liquid controlled valve is open pressure is released in said chamber and said main valve is quickly opened by supply liquid pressure thereon and when said liquid controlled valve is closed pressure is increased in said chamber, whereupon said main valve closes under the influence of said bias, shutting off the flow of supply liquid to the tank, means providing an auxiliary outlet passage leading from said chamber to said inlet-outlet passage, a release valve normally closing said auxiliary passage, and means operable for actuating said release valve thereby to first release the pressure in said chamber, and thereafter to quickly open said main valve against the influence of said bias thereby to permit liquid to drain from said tank through said inlet-outlet passage.

3. In apparatus for controlling the filling and draining of liquid in a tank through normally closed external supply and drain conduits, the combination comprising means having an inlet-outlet passage through which liquid is supplied to and drained from said tank, a hollow valve body overlying said passage, an assembly including a main valve normally closing said inlet-outlet passage, and a piston in said body movable with said main valve and defining with said body a chamber over said piston, means biasing said main valve and yieldably holding the same in closed position, said main valve being movable for opening said inlet-outlet passage and said piston being movable in said body, against the influence of said bias, by supply liquid entering the tank through said inlet-outlet passage, means providing an inlet passage leading to said chamber from the inlet-outlet passage of said main valve, means providing an outlet passage leading from said chamber to the interior of the tank, a liquid controlled valve in said outlet passage open to permit maximum flow through said outlet passage, said liquid controlled valve being responsive to liquid level in the tank for closing, thereby to shut off flow through said outlet passage so that when said liquid controlled valve is open pressure is released in said chamber and said main valve is quickly opened by supply liquid pressure thereon and when said liquid controlled valve is closed pressure is increased in said chamber, whereupon said main valve closes under the influence of said bias, shutting off the flow of supply liquid to the tank, means providing an auxiliary outlet passage leading from said chamber to said inlet-outlet passage, means normally closing said auxiliary passage including an axially shiftable stem, a release valve mounted upon said stem for movement therewith, and means biasing said release valve and stem and yieldably holding said release valve closed, and means for axially shifting said stem to open said released valve against the influence of its bias and to first release the pressure in said chamber and thereafter to quickly open said main valve against the influence of its bias thereby to permit liquid to drain from said tank through said inlet-outlet passage.

4. In apparatus for controlling the filling and draining of liquid in a tank through normally closed external supply and drain conduits, the combination comprising means having an inlet-outlet passage through which liquid is supplied to and drained from said tank, a hollow valve body overlying said passage, an assembly including a main valve normally closing said inlet-outlet passage, and a piston in said body movable with said main valve and defining with said body a chamber over said piston, means biasing said main valve and yieldably holding the same in closed position, said main valve being movable for opening said inlet-outlet passage and said piston being movable in said body, against the influence of said bias, by supply liquid entering the tank through said inlet-outlet passage, means providing an inlet passage leading to said chamber from the inlet-outlet passage of said main valve, means providing an outlet passage leading from said chamber to the interior of the tank, a liquid controlled valve in said outlet passage open to permit maximum flow through said outlet passage, said liquid controlled valve being responsive to liquid level in the tank for closing, thereby to shut off flow through said outlet passage so that when said liquid controlled valve is open pressure is released in said chamber and said main valve is quickly opened by supply liquid pressure thereon and when said liquid controlled valve is closed pressure is increased in said chamber, whereupon said main valve closes under the influence of said bias, shutting off the flow of supply liquid to the tank, means providing an auxiliary outlet passage leading from said chamber to said inlet-outlet passage, means normally closing said auxiliary passage including an axially shiftable stem, a release valve mounted upon said stem for movement therewith, a stop on said stem disposed for abutting the bottom of said assembly to limit the upward movement of said stem and release valve relative to said assembly, and means biasing said release valve and stem and yieldably holding said release valve closed, and means for axially shifting said stem for engagement of said stop with the bottom of said assembly to open said relief valve against the influence of its bias and to first relieve the pressure in said chamber and thereafter to quickly open said main valve against the influence of its bias thereby to permit liquid to drain from said tank through said inlet-outlet passage.

(References on following page)

References Cited in the file of this patent

UNITED STATES PATENTS

| | | |
|---|---|---|
| 1,281,566 | Hedges | Oct. 15, 1918 |
| 2,213,488 | Dowrick | Sept. 3, 1940 |
| 2,243,711 | Lamb | May 27, 1941 |
| 2,301,821 | Scott | Nov. 10, 1942 |
| 2,318,236 | Layton | May 4, 1943 |
| 2,516,996 | Jensen | Aug. 1, 1950 |
| 2,557,378 | Granberg | June 19, 1951 |
| 2,730,126 | Jensen | Jan. 10, 1956 |
| 2,775,258 | Fraser | Dec. 25, 1956 |
| 2,834,378 | Niesemann | May 13, 1958 |
| 2,849,019 | Oliveau | Aug. 26, 1958 |
| 2,888,030 | McQueen | May 26, 1959 |